Jan. 13, 1931.  A. MOORHOUSE  1,788,732
MOTOR VEHICLE
Filed April 26, 1924   4 Sheets-Sheet 2
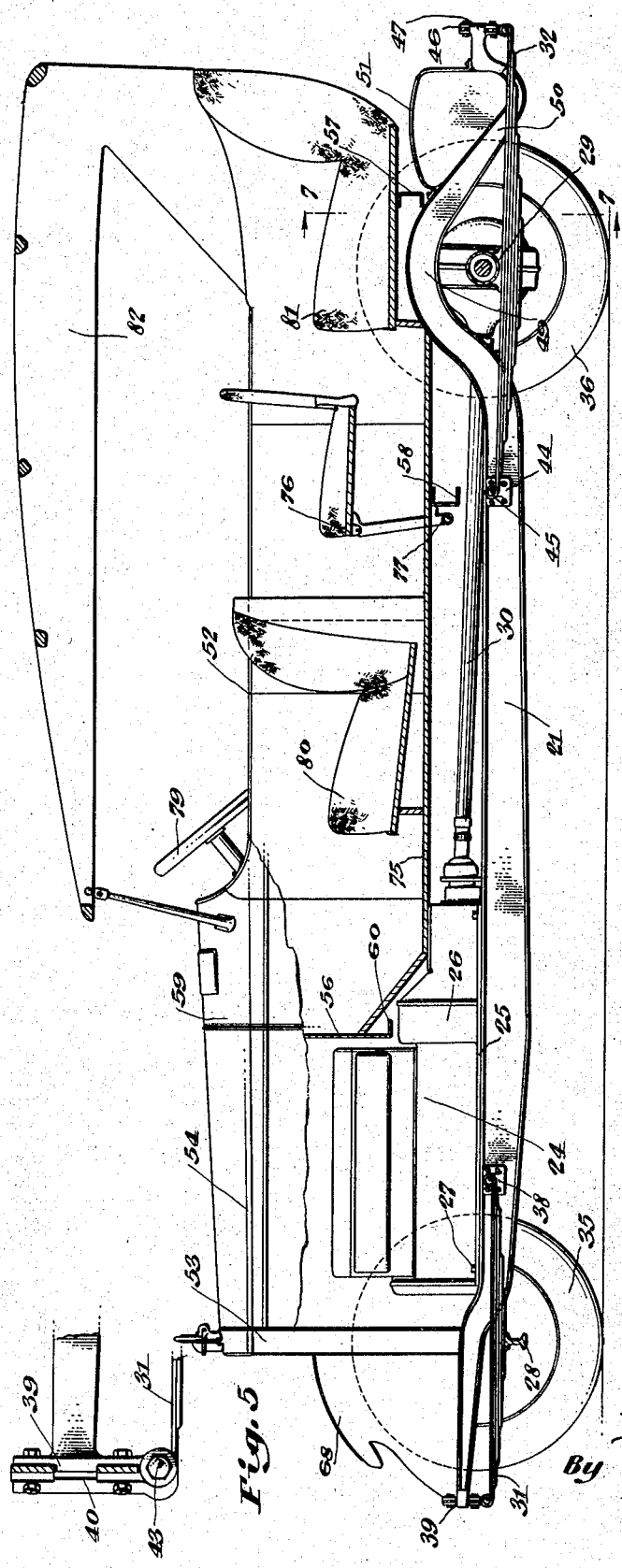
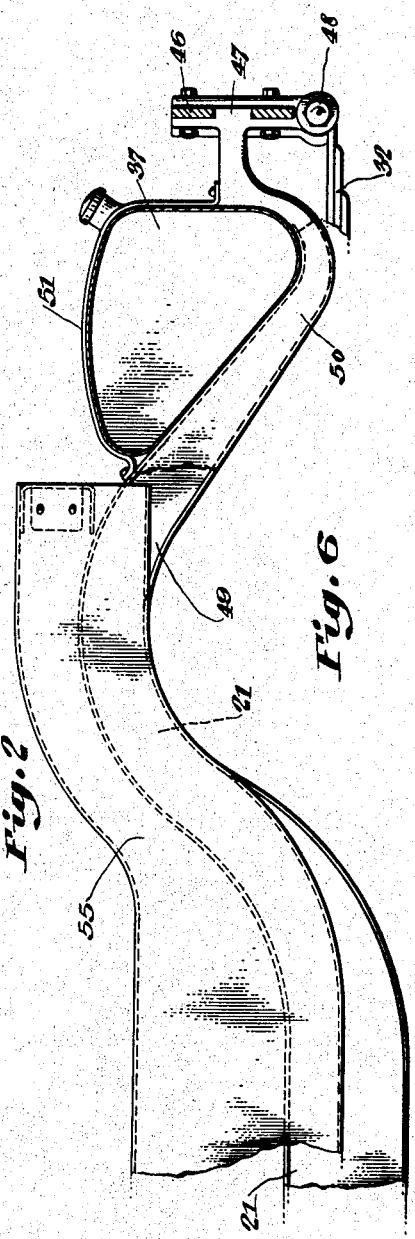
Inventor
Alfred Moorhouse
By Wilton Tibbitts
Attorney

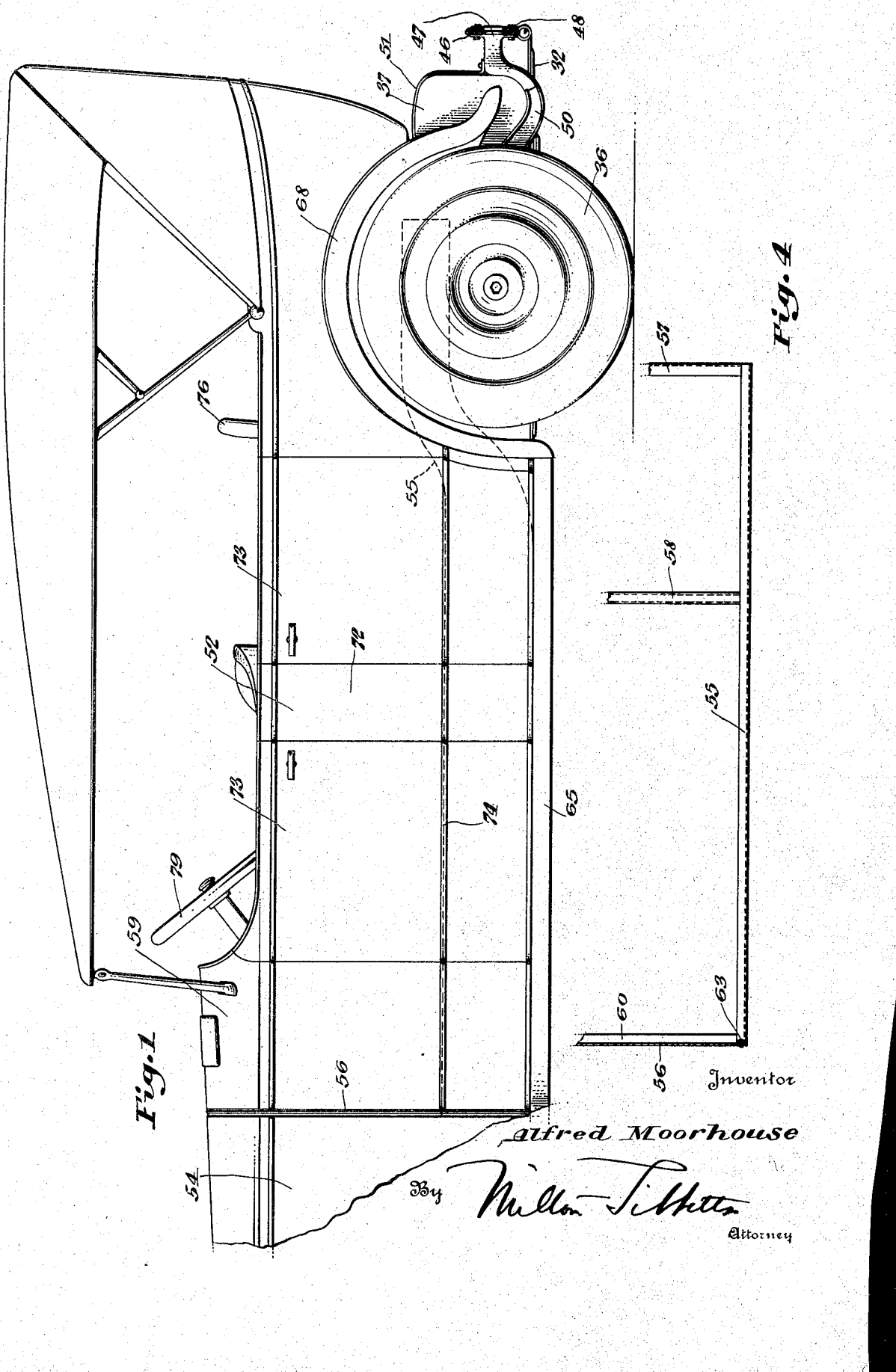

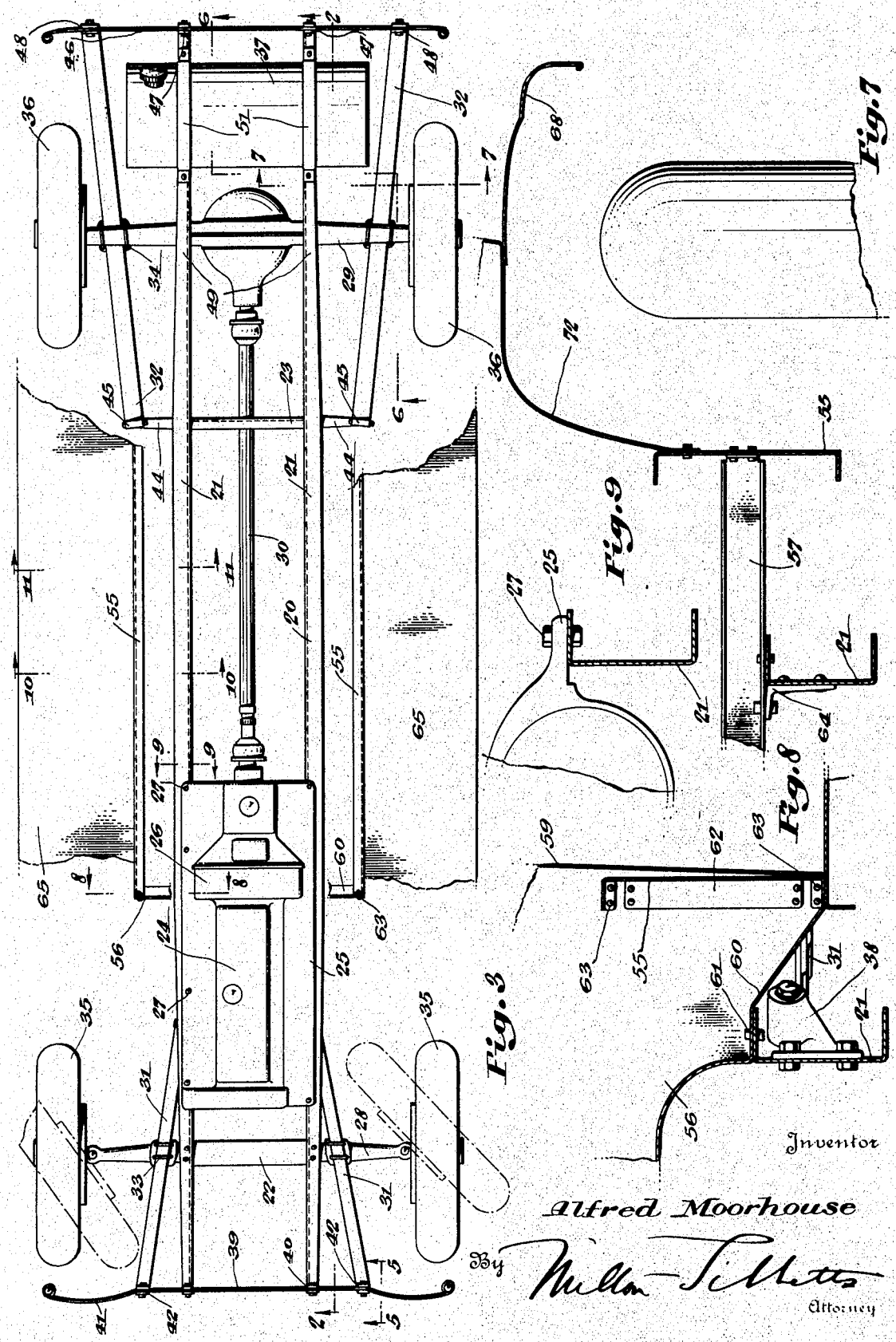

Jan. 13, 1931.   A. MOORHOUSE   1,788,732
MOTOR VEHICLE
Filed April 26, 1924   4 Sheets-Sheet 4

Inventor
Alfred Moorhouse
By William Tillotts
Attorney

Patented Jan. 13, 1931

1,788,732

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed April 26, 1924. Serial No. 709,101.

This invention relates to motor vehicles and particularly to the chassis and body construction thereof.

One of the objects of the invention is to produce a strong and light vehicle.

Another object of the invention is to provide a motor vehicle with a simplified chassis frame and with a body frame supporting and reinforced by the step-boards.

Another object of the invention is to provide combination bumper and spring supports for a motor vehicle chassis.

Another object of the invention is to provide a simplified support for the vehicle folding seats.

Another object of the invention is to provide a simplified fuel tank arrangement and support on the vehicle.

Another object of the invention is to provide a body panel and door construction of novel and simple form.

Another object of the invention is to provide a narrow chassis frame so that the motor may rest directly upon it, together with a wide body frame which may set down below the top of the chassis frame and thereby give a low effect to the appearance of the car.

Other objects of the invention will appear from the following description taken in connection with the drawings, which form a part of this specification, and in which:

Fig. 1 is a side elevation of part of a motor vehicle embodying the invention;

Fig. 2 is a vertical longitudinal section through the vehicle shown in Fig. 1, the section being substantially on the line 2—2 of Fig. 3;

Fig. 3 is a plan view of the vehicle chassis;

Fig. 4 is a plan view of a portion of the body frame;

Fig. 5 is an enlarged detail section on the line 5—5 of Fig. 3;

Fig. 6 is a somewhat enlarged detail view, partly in section, on the line 6—6 of Fig. 3;

Fig. 7 is an enlarged transverse section substantially on the line 7—7 of Figs. 2 and 3;

Fig. 8 is an enlarged section on about the same scale as Fig. 7, substantially on the line 8—8 of Fig. 3;

Fig. 9 is an enlarged section on the line 9—9 of Fig. 3;

Figure 10:
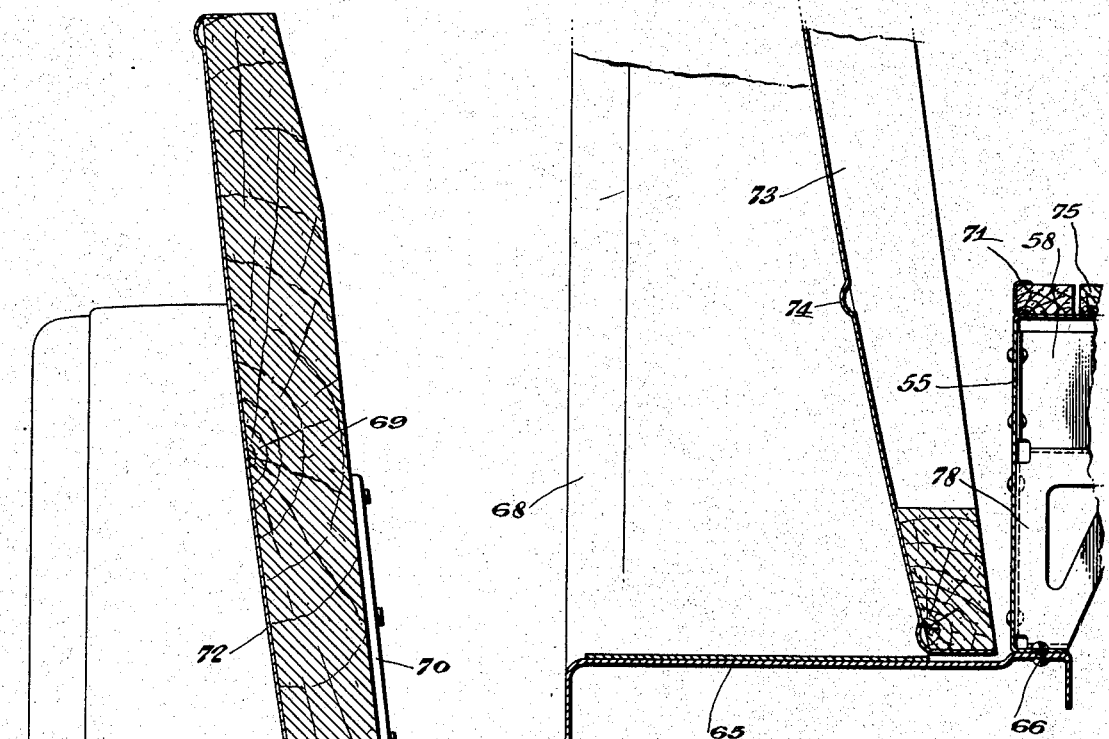
Fig. 10 is an enlarged transverse sectional view substantially on the line 10—10 of Fig. 3.

Referring to the drawings, 20 represents the chassis frame having side bars 21 and several cross members 22 and 23. The motor, clutch and transmission unit is shown at 24 and this unit is mounted directly upon the side members 21 of the frame, the frame side members being relatively close together so that there is just room for the motor to fit down between them and for the flanges 25 of the motor unit to rest on the side members. The fly-wheel housing of the motor is represented at 26 and it will be seen that the frame side members are only slightly farther apart than the diameter of the fly-wheel.

In Fig. 9 it will be seen that the side member 21 is of channel section and its flanges are turned outwardly so that the channel is accessible from the sides of the vehicle. The motor unit flanges 25 are secured to the upper flanges of the side bars 21 as by several bolts 27. This arrangement of frame and engine forms a very rigid construction and permits of a very simple casting for the motor unit.

At the front end of the frame is the vehicle steering axle 28 and at the rear end is the driving axle 29. A propeller shaft 30 extends from the motor and transmission unit to the rear driving axle for driving the vehicle in the usual way.

The axles are connected to the chassis frame by four springs, the front springs being indicated at 31 and the rear springs at 32. All of these springs are arranged somewhat diagonally, as shown more particularly in Fig. 3, and they are secured intermediate their ends to their respective axles. The front springs are so secured at 33 and the rear springs at 34.

One of the advantages of this diagonal arrangement of the springs is that it brings the inner ends of the springs, that is, the rear ends of the front springs and the front ends of the rear springs, closer to the narrow chassis frame which is used in this construction, so that these inner ends may be shackled to the frame or to relatively short brackets on the frame, and at the same time it separates the outer ends of the springs, that is, the front ends of the front springs and the rear ends of the rear springs, from the narrow chassis frame so that flexible cross brackets may be used to connect these outer ends of the springs to the frame. Also, at the front end of the chassis it permits of a wider swinging of the steering wheels. When the steering wheels are swung to the left as shown in dotted lines in Fig. 3, the left wheel is, of course, swung farther around than is the right wheel, because the left wheel must turn with a shorter radius, this difference in the turning of the wheels being taken care of by the usual steering connections, not shown in the drawing. When the wheels are thus turned the left wheel has plenty of clearance with the diagonally arranged springs and, because the right wheel does not turn so far, it still has plenty of clearance at the front end of the spring. Of course the same situation exists when the wheels are turned to the right.

At the rear end of the vehicle the diagonal arrangement of the springs provides a larger space for the fuel tank which is usually mounted at this point.

The steering wheels referred to above are indicated at 35 and the driving wheels on the rear axle are numbered 36, while the fuel tank, referred to above, is numbered 37.

The rear ends of the front springs extend into the channels of the frame side members 21, as shown particularly in Figs. 3 and 8, and pivot brackets 38 connect these spring ends to the frame members, the brackets being mounted in the channels and secured to the frame members 21 as shown in Fig. 8.

The outer or front ends of the front springs 31 are connected to the front ends of the frame members 21. As shown, these connections form a part of the front bumper of the vehicle. The bumper is indicated at 39 and it extends transversely of the vehicle and is attached to the front ends of the frame members 21 as at 40. The bumper extends laterally in front of the steering wheels as shown at 41 and at the points 42 it is connected to the front ends of springs 31. This is preferably a pivotal connection as shown at 43 in Fig. 5.

The bumper 39 is preferably of spring material thereby making it flexible so that it forms a flexible bracket for the front ends of the front springs of the vehicle.

The front ends of the rear springs 32 of the vehicle are pivoted to suitable brackets 44 extending laterally from the frame members 21. The pivotal connection to these brackets is indicated at 45 both in Fig. 3 and Fig. 11. The rear ends of the springs 32 are connected to the chassis frame similarly to the front ends of the front springs. Thus a bumper bar 46 extends across the rear end of the vehicle and is connected to the frame members 21 at 47 and to the spring rear ends at 48.

The frame members 21, as shown particularly in Figs. 2 and 6, are bent upwardly over the rear axle 29 as at 49, and rearwardly of the axle these frame members dip as at 50 to form a seat for the fuel tank 37 above referred to. Straps 51 extend around the tank and secure it to the frame members.

Mounted upon the chassis frame 20 is the body 52 which has its own independent frame, the side bars or sills of which are arranged considerably out-board from the chassis frame members 21 and somewhat below the top of said chassis members so that a low appearance is given the vehicle.

Also mounted on the chassis frame, forwardly of the motor unit 24, is a radiator 53 which is suitably connected to the motor, and a bonnet 54 covers the motor between the front end of the body and the radiator.

The principal parts of the body frame are the side members or sills 55, the front member 56, the rear member 57, and intermediate cross members 58, of which there may be several. Most of these members are of channel form, particularly the side members and the flanges of the side members preferably extend inwardly. The front cross member, that is, the member 56, forms the dash of the vehicle and the cowl 59 is suitably secured to it. It is also formed with a flange 60, shown particularly in Figs. 2 and 8, which rests upon the chassis frame members 21 and is bolted thereto as shown at 61, in Fig. 8. The front ends of the side members 55, both the web and the flanges thereof, are bent over and riveted or otherwise secured to the dash or cross member 56 as shown at 62 and 63, in Fig. 8.

At the rear end of the vehicle the cross member 57 rests upon brackets 64 secured to the chassis frame members 21, as shown particularly in Fig. 7, so that the body frame is supported principally at two points, at the front end by the cross member 56 on the chassis frame and at the rear end by the cross member 57 on the chassis frame.

Step-boards or running-boards 65 are arranged on each side of the vehicle and, instead of being connected to the chassis frame in the usual way, are connected directly to the body frame side members or sills 55. They may be riveted to the lower flanges or these sills as shown at 66, in Figs. 10 and 11, or they may be otherwise firmly secured to the sills. At either end each of these step-boards is formed with a transverse flange 67 to thereby strengthen the ends of the step-boards. Fenders 68 are secured to the ends of the step-boards 65 for further supporting them.

Figure 11:
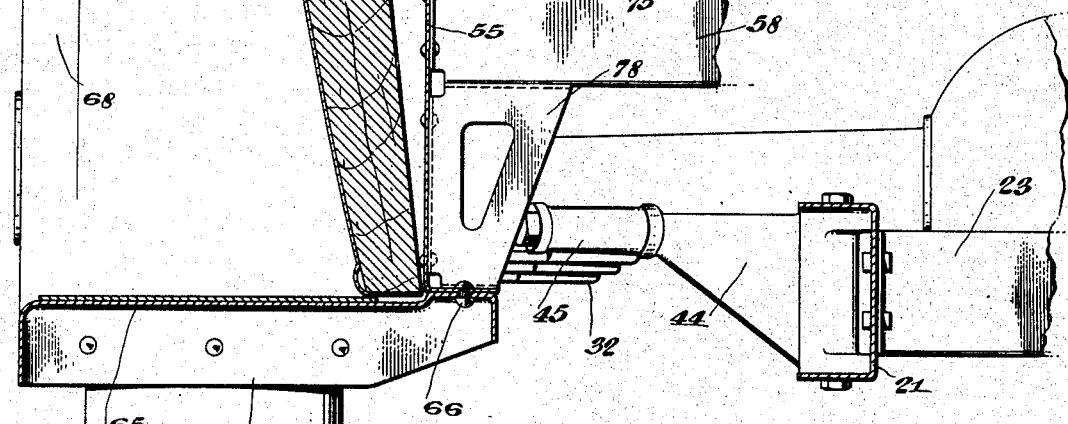
Fig. 11 is an enlarged transverse sectional view substantially on the line 11—11 of Fig. 3.

The body also comprises several upright frame members such as those illustrated at 69 in Fig. 11, and these may be secured to the body sills 55 as by brackets 70 and boards 71, the latter of which may extend along the tops of the sills and fill the spaces between the upper edge of the sill and the body panels. Body panels 72 are secured to the frame, as shown in the various figures, the fenders 68 being fastened to them and to the body frame where desirable, and doors 73 are suitably hinged to the pillars or upright frame members of the body so that they may open and close for access to the front and rear compartments of the body. It will be seen that the body panels 72 and the doors 73 extend down below the top of the sill 55, in fact, all the way to the bottom of said sill so that they just clear the step-boards 65 in opening. If desired, a suitable moulding 74 may be extended along the panels and doors about at the floor line of the vehicle to give a longer appearance to the car.

As shown in Figs. 10 and 11, the floor boards 75 of the vehicle may rest directly upon the upper flange of the sills 55 so that the floor is very low relative to the vehicle chassis. Also, if the vehicle is provided with folding seats, these seats 76 may be directly pivoted to one of the body cross members 58, as shown at 77 in Fig. 2. The cross member in this instance may be braced by suitable gusset plates 78 as shown in Figs. 10 and 11.

The steering wheel of the vehicle is indicated at 79, the front seat is shown in Fig. 2 at 80, and the rear seat at 81. The vehicle may be provided with a top 82 as shown in Figs. 1 and 2.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a motor vehicle, the combination of a chassis frame having side members of channel form with the flanges turned outwardly, and a body frame rigidly supported on the chassis frame and having side members of channel form with flanges turned inwardly said body frame having its side members outside of the chassis frame.

2. In a motor vehicle, the combination of a chassis frame, and a body frame comprising side members and a dash member secured to the forward ends thereof, said dash member resting on the chassis frame, and forming a support thereon for the front end of the body frame.

3. In a motor vehicle, the combination with a chassis frame, and a separate body frame comprising side members and an end member, said end member being arranged to form the dash of the vehicle, and said end member resting on the chassis frame and supporting the front end of the body frame therefrom.

4. In a motor vehicle, the combination of a chassis frame, and a separate body frame comprising side members and end members, only said end members of the body frame resting on the chassis frame and supporting the body frame therefrom, and one of said end members forming the vehicle dash.

5. In a motor vehicle, the combination of a body frame having a full length side member of channel form and a separate step member secured directly to and supported by the lower flange of said body member.

6. In a motor vehicle, the combination of a body frame member having its major axis extending longitudinally of the vehicle, a step member supported from the lower edge of said frame member and extending outwardly therefrom, and a body panel extending downwardly to the step member.

7. In a motor vehicle, the combination of a chassis frame, a body frame comprising side members spaced laterally from and independent of said chassis frame and a dash member secured to the ends of the body frame members and rigidly secured to said chassis frame.

8. In a motor vehicle, the combination with a chassis having side members, of a body frame comprising longitudinal side channels spaced laterally from said chassis side members and entirely out of engagement therewith, main, full height body panels secured to said side channels and floor boards resting directly on the upper flanges of said side channels.

9. In a motor vehicle, the combination of a chassis frame having side members each formed with a dip immediately to the rear of the kick-up and a fuel tank resting in said dips and on a part of the kick-up, supported by said frame members and extending laterally beyond the frame members.

10. In a motor vehicle, the combination of a chassis frame having longitudinal members with a kick-up at the rear, a body frame having side members outside of the chassis frame, an end member resting on said kick-up and secured to the side members and a front end member secured to the side members and resting on the chassis longitudinal members, said end members constituting the only connection between the said frames.

11. In a motor vehicle, the combination with a chassis frame, of a body frame having a longitudinal channel member outside of and partly below the top of the chassis frame, a step member for the vehicle, the bottom edge of said channel being at the level of the step, said step being directly secured to the lower flange of the channel and solely supported thereby.

In testimony whereof I affix my signature.

ALFRED MOORHOUSE.